United States Patent [19]

Matsuoka

[11] Patent Number: 5,065,714
[45] Date of Patent: Nov. 19, 1991

[54] HEAT-INSULATING STRUCTURE OF SWIRL CHAMBER AND ITS PRODUCTION METHOD

[75] Inventor: Hiroshi Matsuoka, Yamato, Japan

[73] Assignee: Isuzu Motors Limited, Tokyo, Japan

[21] Appl. No.: 558,373

[22] Filed: Jul. 27, 1990

[30] Foreign Application Priority Data

Jul. 27, 1989 [JP] Japan ................................. 1-192589

[51] Int. Cl.⁵ .................... F02B 19/08; F02B 19/16
[52] U.S. Cl. ...................................... 123/254; 123/271
[58] Field of Search ............... 123/254, 269, 270, 271, 123/668, 669; 29/888.06, 888.061

[56] References Cited

U.S. PATENT DOCUMENTS

| | | | |
|---|---|---|---|
| 4,616,611 | 10/1986 | Ogawa et al. | 123/270 |
| 4,644,926 | 2/1987 | Sakurai et al. | 123/569 |
| 4,676,207 | 6/1987 | Kawamura et al. | 123/271 |
| 4,681,074 | 7/1987 | Ogawa et al. | 123/271 |
| 4,699,102 | 10/1987 | Taniguchi | 123/271 |
| 4,834,042 | 5/1989 | Wakasa et al. | 123/271 |
| 4,844,037 | 7/1989 | Miyakawa et al. | 123/270 |
| 4,875,939 | 10/1989 | Miyakawa et al. | 123/271 |

FOREIGN PATENT DOCUMENTS

| | | | |
|---|---|---|---|
| 0186943 | 7/1986 | European Pat. Off. | |
| 2621076 | 3/1989 | France | |
| 0173634 | 11/1960 | Japan | |
| 0188024 | 10/1984 | Japan | 123/271 |
| 0030421 | 2/1985 | Japan | 123/270 |
| 0190616 | 9/1985 | Japan | |
| 6183451 | 4/1986 | Japan | |
| 2055965 | 6/1981 | United Kingdom | |

Primary Examiner—Willis R. Wolfe
Attorney, Agent, or Firm—Browdy and Neimark

[57] ABSTRACT

In a heat-insulating structure of a swirl chamber and its production method in accordance with the present invention, each swirl chamber block for forming a swirl chamber and a jet port is made of a ceramic material in such a manner as to make the thickness of the jet port formation portion greater than that at other portions, a metallic outer block is disposed to the outer surface of each swirl chamber block by casting so as to control the residual compressive stress, which is to be imparted to the swirl chamber block, to be great at the jet port formation portion and thus to improve the strength of the swirl chamber block, and the temperature of each swirl chamber is controlled uniformly by changing the contact area between a cylinder head and the outer block so as to reduce the thermal stress.

6 Claims, 3 Drawing Sheets

HEAT-INSULATING STRUCTURE OF SWIRL CHAMBER AND ITS PRODUCTION METHOD

BACKGROUND OF THE INVENTION

1. Field of the Invention

This invention relates to a heat-insulating structure of a swirl chamber in an internal combustion method and to its production method.

2. Description of the Prior Art

Generally, in combustion chambers of a swirl chamber type in an internal combustion engine, mixing of a fuel and air is made twice each in swirl chamber and main combustion chamber and the mixing state is better than in those of a direct injection type. However, the loss of cooling water is greater with the swirl chamber type than with the direct injection type and the fuel efficiency becomes lower. Therefore, attempts have been made to constitute the swirl chamber in a heat-insulating structure in order to minimize the loss of cooling water. However, in the case of the heat-insulating structure wherein the outer surface of the swirl chamber is heat-insulated uniformly, the durability problem with the swirl chamber arises due to thermal stress difference.

If the ceramic material constituting each swirl chamber block is silicon nitride ($Si_3N_4$), silicon carbide (SiC), or the like, the ceramic material such as silicon nitride ($Si_3N_4$), silicon carbide (SiC), or the like, has high heat resistance and can withstand a high temperature and high strength, but has high heat transfer rate and a low heat-insulating property. Since the ceramic material has a high Young's modulus and high deformation resistance, a high thermal stress acts on it if any nonuniformity occurs in its temperature distribution. Further, the temperature distribution of the inner wall surface constituting each swirl chamber is such that the jet port portion for communicating the main combustion chamber with the swirl chamber reaches a high temperature and moreover, the temperature distribution around the jet port portion is such that the jet port portion on the center side of the main combustion chamber reaches particularly a high temperature. Therefore, if each swirl chamber block constituting the inner wall portion of the swirl chamber is made of a ceramic material, the temperature distribution at the jet port portion of the swirl chamber block becomes considerably nonuniform and the thermal stress therefore acts and exerts adverse influences on the strength of the ceramic material, causing thereby the problem of durability. Accordingly, a problem remains to be solved as to how each swirl chamber itself be constituted in order to improve durability of the swirl chamber block.

A production method of a swirl chamber of an engine is known in the past from Japanese Patent Laid-Open No. 83451/1986, for example. The production method of the swirl chamber of the engine disclosed in this prior art reference fits an outer cylinder of an iron type sintered material which is subjected to compression powder molding or preparatory sintering to an inner cylinder made of a ceramic and then couples the inner and outer cylinders integrally by regular sintering to produce the swirl chamber of the engine. Namely, an insert member is prepared by integrating ceramic particles by use of a copper type bonding material and molding the integrated member in a shape substantially equal to the shape of a heat-insulating chamber to be formed at a predetermined position between the inner and outer cylinders described above, and after this insert member is interposed to the predetermined position between the inner and outer cylinders, the regular sintering step is carried out.

In the production method of the swirl chamber of the engine described above, the outer peripheral metal material consists of the sintered material. Therefore, the sintered metal has the function of only sealing the heat-insulating layer but cannot control the compressive force or the heat-insulating degree. In other words, this production method does not have the technical concept of improving durability of the inner cylinder made of the ceramic material.

An antechamber insert of an engine is described, for example, in Japanese Utility Model Laid-Open No. 173624/1985. This antechamber insert is produced by inserting a ceramic hollow member for constituting the inner wall of the antechamber of an engine into an insert metal component and is assembled into a hole that is formed in advance in a cylinder head so as to constitute the antechamber of the internal combustion engine. The ceramic hollow member described above is formed in such a manner that at least its outer peripheral surface coming into contact with the insert metal is tapered towards the open end of the ceramic hollow member.

In other words, in the antechamber insert of the engine described above, the ceramic hollow chamber for forming the swirl chamber and the portion of the jet port for communicating the main combustion chamber with the swirl chamber are constituted separately from each other. Thus, this prior art technique is not directed to control the temperature distribution for the hollow chamber and the jet port portion and to control the overall compressive force.

Furthermore, when the block constituting the swirl chamber is directly casted to a large-scale member such as the cylinder head, deviation of dimension at the time of casting becomes so excessive that the resulting product cannot be used as the product. The deviation of the casting dimension is about ±1.5 mm for the size of about 500 mm, for example, but accuracy of the position dimension of the swirl chamber must be about ±0.2 mm.

The method of imparting the residual compressive stress to the ceramic material by shrinkage fit of the metal material to the ceramic material cannot impart effective residual compressive stress because the adding direction of the compressive force is unidirectional.

SUMMARY OF THE INVENTION

It is a main object of the present invention to solve the problems described above. Namely, in an internal combustion engine including a cylinder block having formed therein cylinders, a cylinder head fixed to the cylinder block and equipped with hole portions formed in such a manner as to correspond to the cylinders for forming swirl chambers, and main combustion chambers formed inside said cylinders of said cylinder block, the present invention relates to a heat-insulating structure of a swirl chamber which comprises ceramic swirl chamber blocks having formed therein the swirl chambers and jet ports for communicating the swirl chambers with the main combustion chambers, and having a greater thickness at the jet port formation portions than at other portions; and outer blocks made of a metal, disposed on the outer surfaces of the swirl chamber blocks by casting and equipped with flange portions at the portions for forming the head lower surface portions, the outer blocks being fitted into the hole portions formed in the cylinder head so as to define air layers and the flange portions thereof being fitted and fixed into the inlet portions of the hole portions. This heat-insulating structure of the swirl chamber can control the stress distribution of the residual compressive stress of the swirl chamber block and can control the temperature distribution of the swirl chamber.

It is another object of the present invention to provide a heat-insulating structure of a swirl chamber which forms the inner wall portion of each swirl chamber, which is exposed to a combustion gas, by a ceramic material having high heat resistant and high thermal shock resistance such as silicon nitride, aluminum titanate, or the like, to attain a structure capable of withstanding the high temperature combustion gas; and controls particularly the stress distribution of the compressive force imparted by the outer block made of a metal material to the swirl chamber block made of the ceramic material having high heat resistance and high strength by casting the metal material to the outer surface of the swirl chamber block, so as to impart the optimum residual compressive stress to the swirl chamber block and to secure its strength, and to secure the strength of the jet port formation portion in consideration of the fact that the jet port portions of the swirl chambers of the heat-insulating structure should meet severe strength requirements caused by thermal stress and mechanical stress and are subjected to high temperature.

It is still another object of the present invention to provide a heat-insulating structure of a swirl chamber which uniformly controls the temperature distribution of the swirl chamber block by optimally setting the contact portion and contact area between the outer block and the cylinder head; makes thermal radiation vigorous at the portion which becomes high temperature region, such as the jet port portions of the swirl chambers, so as to mitigate heat accumulation; can accomplish extremely excellently and rapidly the temperature control so that the temperature distribution becomes uniform not only at the entire peripheral portions of the jet port portions of the swirl chamber blocks but also throughout the swirl chamber blocks as a whole; can keep the swirl chamber blocks always under the excellent temperature distribution; and can prevent the occurrence of thermal stress to the swirl chamber blocks, can improve the strength of each swirl chamber block itself and provides a heat-insulating structure having high durability.

In this heat-insulating structure of the swirl chamber, the residual compressive stress is imparted by the outer block of the cast metal to the swirl chamber block made of the ceramic material having high temperature resistance and high strength, so that the occurrence of damage to the swirl chamber block such as cracks, breakage, etc., can be prevented while securing its strength, its durability can be improved and moreover, the residual compressive stress imparted to the swirl chamber block can be freely controlled both entirely and locally by selecting the optimum thickness of the outer block and the contact portion with the swirl chamber block. Particularly because the thickness of the jet port formation portion of the swirl chamber block, on which the severest strength requirement is imposed, is increased, the strength of the jet port formation portion can be secured sufficiently.

In this heat-insulating structure of the swirl chamber, furthermore, the excellent heat-insulating degree can be obtained for each swirl chamber by selecting the optimum thickness of the swirl chamber block made of the ceramic material and the optimum thickness of the air layer formed between the outer block and the cylinder head. Moreover, the quantity of heat energy of the swirl chamber block which is thermally radiated to the cylinder head can be controlled by optimally selecting the contact area or contact portion between the outer block and the cylinder head and particularly, the overheat of the jet port formation portion of the swirl chamber block can be prevented by mitigating heat accumulation at the jet port formation portion, and durability can be improved by making uniform the temperature distribution not only at the entire peripheral portion of the jet port portion of the swirl chamber block but also throughput the entire swirl chamber block so as to reduce the occurrence of the thermal stress to the swirl chamber block.

It is still another object of the present invention to provide a heat-insulating structure of a swirl chamber having high quality reliability of the product because each outer block is fitted to the hole portion formed in the cylinder head while forming the air layer and the flange portion is fitted and fixed into the inlet portion of the hole portion. According to this structure, the deviation of dimension at the time of casting does not become excessive in comparison with the prior art technique wherein the block constituting the swirl chamber is directly casted to a large-scale member such as the cylinder head.

It is still another object of the present invention to provide a production method of a heat-insulating structure of a swirl chamber which comprises the steps of forming each swirl chamber block for forming a swirl chamber communicating with a main combustion chamber through a jet port by a ceramic material; forming an outer block by casting a metal material to the outside of the swirl chamber block; and assembling the outer block into a hole portion formed in a cylinder head while forming an air layer.

This production method of the heat-insulating structure of a swirl chamber can easily provide the heat-insulating structure of the swirl chamber described above through each of the steps described above, can reduce the deviation of dimensional accuracy in the production steps, can improve reliability of quality of the product, can prevent the excessive deviation of dimension at the time of casting by first producing the individual heat-insulating structure of the swirl chamber and then assembling it into the cylinder head, or in other words, by casting the outer block to the outside of the swirl chamber block and then assembling it into the cylinder head, unlike the prior art technique wherein the block constituting the swirl chamber is directly casted to the large-scale member such as the cylinder head. Particularly, the compressive force is easily imparted to the swirl chamber block made of the ceramic material by casting of the outer block, the occurrence of damage to the swirl chamber block such as cracks, breakage, etc., can be prevented while securing the strength of the swirl chamber block and durability of the swirl chamber can be improved.

In this production method of the heat-insulating structure of the swirl chamber, the metal material for forming the outer block is selected from the group of aluminum, cast iron and Niresist, and the compressive force by the outer block can be controlled easily by adjusting the thickness of the outer block. Thus, the strength of the swirl chamber block can be improved.

DETAILED DESCRIPTION OF THE EMBODIMENTS

Hereinafter, preferred embodiments of the heat-insulating structure of a swirl chamber will be explained in detail with reference to the accompanying drawings.

Figure 1:
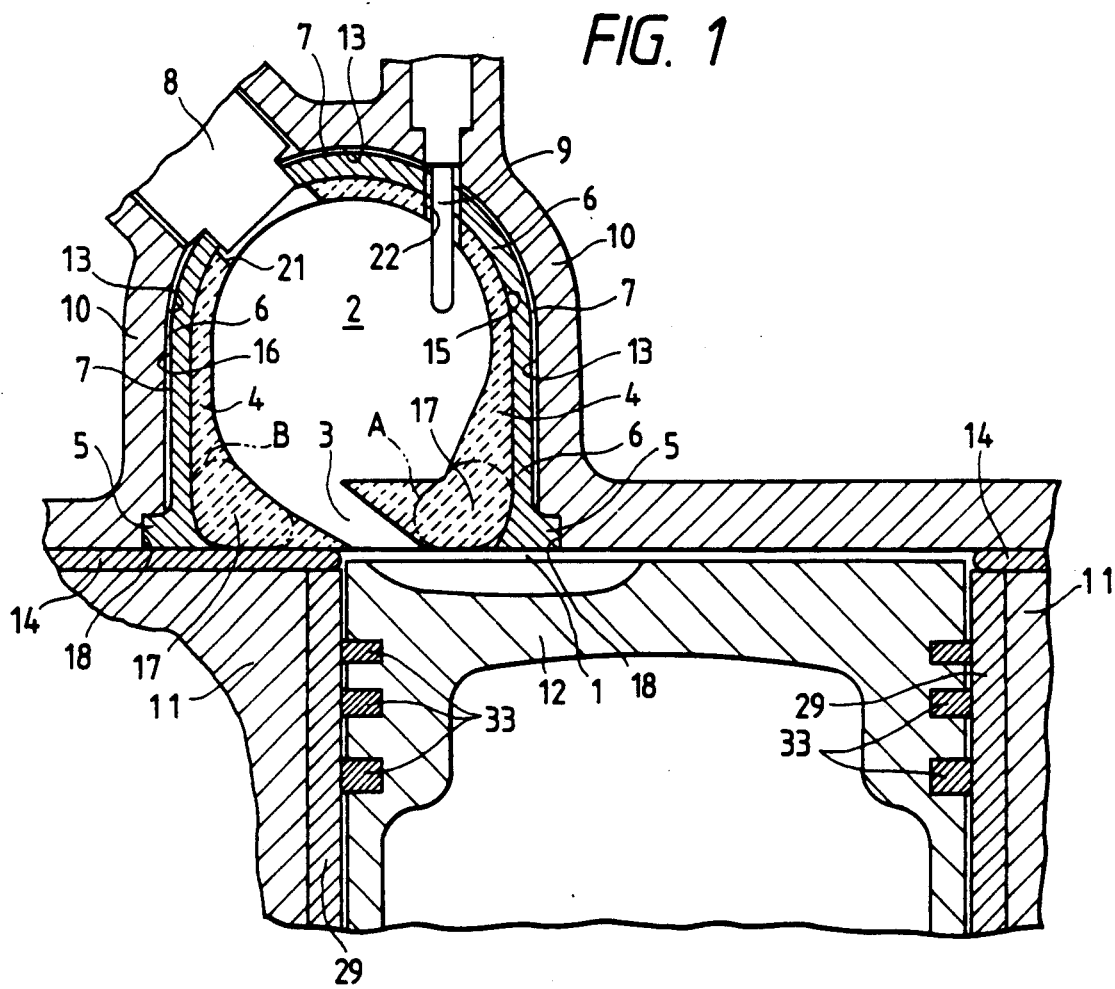
FIG. 1 is a sectional view showing a heat-insulating structure of a swirl chamber in accordance with one embodiment of the present invention.
Figure 2:
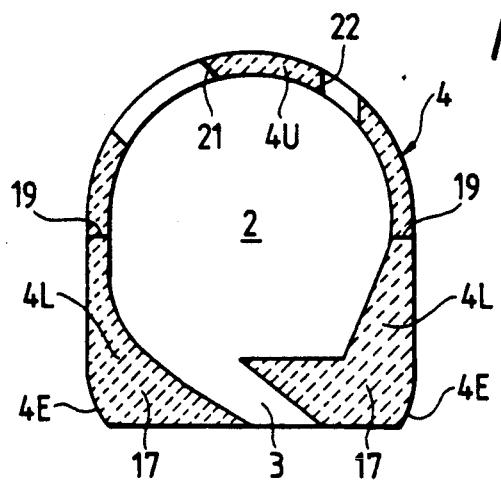
FIG. 2 is a sectional view showing an example of a swirl chamber block to be assembled into the heat-insulating structure of a swirl chamber shown in FIG. 1.

FIG. 1 is a sectional view showing the heat-insulating structure of a swirl chamber in accordance with one embodiment of the present invention.

The internal combustion engine which incorporates the heat-insulating structure of the swirl chamber of this invention includes mainly a cylinder block 11 having formed therein cylinders, a cylinder head 10 fixed to the cylinder block 11 and equipped with hole portions formed in such a manner as to correspond to the cylinders for forming swirl chambers 2, and main combustion chambers 1 formed inside the cylinders of the cylinder blocks. More in particular, the cylinder head 10 is fixed to the cylinder block 11 through a head gasket 14. Cylinder liners 29 for constituting the cylinders are fitted into hole portions formed in the cylinder block 11, respectively. The hole portions 13 are formed in the cylinder head 10 in the number corresponding to the number of the cylinders, and an outer block 6 is fitted into each of these hole portions 13 under the state where it defines an air layer 7. A piston 12 having fitted thereto a piston ring 33 is fitted into each cylinder liner 29 in such a manner as to be capable of reciprocation. A fuel injection nozzle 8 for atomizing a fuel into the swirl chamber 2 and fitted into a fitting hole 21 of the swirl chamber block 4 and a glow plug 9 for igniting and burning the atomized fuel, fitted into a fitting hole 22 of the swirl chamber block 4 are provided to the swirl chamber 2.

Though not shown in the drawing, intake/exhaust ports are formed in the cylinder head 10 in such a manner as to correspond to each cylinder, valve seats are formed on the lower surface portion of the cylinder head 10 and intake/exhaust valves for opening and closing the intake/exhaust ports are disposed on these seats. The intake port may be formed at the lower part of the cylinder liner 29.

The heat-insulating structure of the swirl chamber in accordance with the present invention comprises mainly each swirl chamber block 4 for forming the swirl chamber, having formed therein a jet port 3 for communicating the swirl chamber 2 with the main combustion chamber 1, each outer block 6 disposed outside the swirl chamber block 4 by casting and the cylinder head 10 positioned outside the outer block 6 while forming an air layer 7 between them. The swirl chamber block 4 that constitutes the swirl chamber 2 is made of a ceramic material such as silicon nitride ($Si_3N_4$), silicon carbide (SiC), aluminum titanate, or the like. In this swirl chamber block 4, the thickness of the portion at which the jet port 3 is formed, or in other words, the thickness of the jet port (3) formation portion 17 is greater than the thickness at other portions so as to withstand high temperature by increasing its heat resistance and strength.

The outer block 6 disposed onto the outer surface 15 of the swirl chamber block 4 by casting is made of a metal material such as aluminum (Al), cast iron (Fc), Niresist, or the like. This outer block 6 is provided with a flange portion 5 at the portion which forms the head lower surface portion. The hole portions 13 are formed in the cylinder head 10 in the number corresponding to the number of cylinders of the engine. Each outer block 6 is fitted and assembled into the hole portion 13 under the state where the air layer 7 is formed, and moreover, the flange portion 5 of the outer block 6 is fixed to the inlet portion 18 of the hole portion 13 by pushing, shrinkage-fit, or the like.

In this heat-insulating structure of the swirl chamber, the jet port formation portion 17 of the swirl chamber block 4 at which the jet port 3 is formed is the region which is exposed to higher temperatures than other portions and on which severer conditions, both thermally and strength-wise, are imposed. Of the jet port formation portion 17 of the swirl chamber block 4 at which the jet port 3 is formed, the portion A positioned on the center side of the main combustion chamber 1 receives serverer thermal influences than the portion B spaced apart from the main combustion chamber 1 and the excessive compressive force acts on it locally. Therefore, the present invention contemplates to provide the structure so that heat accumulation does not occurs at the portions A and B where the jet port 3 of the swirl chamber block 4 is formed, the thermal stress generated in the swirl chamber block 4 due to the temperature difference can be reduced, and furthermore, the strength of these portions A and B can be secured.

This heat-insulating structure of the swirl chamber disposes the cast metal or the outer block 6 outside the swirl chamber block 4 for constituting the swirl chamber 2 by casting the metal, controls the residual compressive stress occurring in the swirl chamber block 4 by setting or controlling the thickness of the outer block 6 to the optimum condition and at the same time, controls the heat-insulating degree of the swirl chamber block 4 by optimally setting or controlling the contact area and contact region between the flange portion 5 of the outer block 6 and the inlet portion 18 of the hole 13 of the cylinder head 10.

Accordingly, in this heat-insulating structure of the swirl chamber, heat accumulation is reduced by bringing the jet port formation portion 17 into contact with the outer block 6 and the heat-insulating degree at this portion is much more reduced than at other portions. In this manner, the heat energy occurring in the swirl chamber block 4 is thermally radiated from the jet port formation portion 17 to the cylinder head 10 lest the temperature rises excessively at the jet port formation portion 17 of the swirl chamber block 4, and the temperature difference between the jet port formation portion 17 and other portions can be reduced. Consequently, the thermal stress occurring in the swirl chamber block 4 can be reduced and the temperature distribution can be uniformly controlled throughout the swirl chamber block as a whole. Furthermore, thermal energy radiated thermally to the cylinder head 10 can be controlled by setting the contact area and contact region between the flange portion 5 of the outer block 6 outside the swirl chamber block 4 and the fitting hole of the cylinder head 10, that is, the inlet portion 18, to the optimum condition. In this manner the temperature distribution of the swirl chamber block 4 made of the ceramic material can be controlled to the optimum state.

The heat-insulating structure of the swirl chamber in accordance with the present invention can be produced in the following manner, for example.

The production method of the heat-insulating structure of the swirl chamber in accordance with the present invention comprises mainly the steps of forming each swirl chamber block 4 forming the swirl chamber 2 communicating with the main combustion chamber 1 through the jet port 3 from the ceramic material; forming each outer block 6 by casting the metal material to the outside of the swirl chamber block 4; and assembling the outer block 6 into the hole portion 13 formed in the cylinder head 10 while forming the air layer 7. More definitely, the production method of the heat-insulating structure of the swirl chamber comprises as follows. First of all, the swirl chamber block 4 in this heat-insulating structure of the swirl chamber is formed by a ceramic material which is highly resistant to the thermal shock, such as silicon nitride ($Si_3N_4$), silicon carbide (SiC), aluminum titanate, or the like. In other words, the swirl chamber block 4 is produced by molding the material into the shape of the swirl chamber block 4 in a unitary structure and then sintering it. Alternatively, the swirl chamber block 4 is divided into upper and lower swirl chamber blocks 4U and 4L, molded and sintered, and then bonded together by chemical vapor deposition, or the like, at the joint portion 19.

Figure 3A:
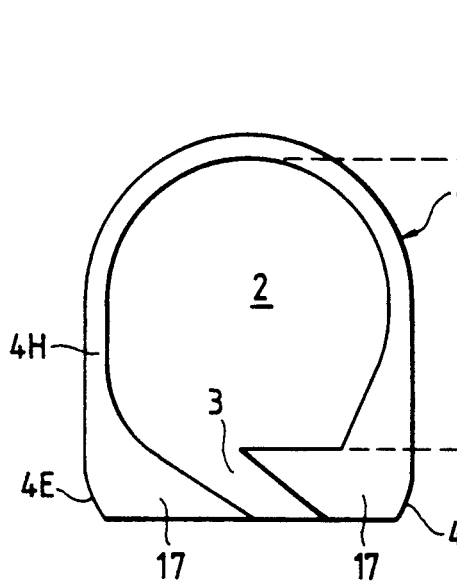
FIG. 3(A) is an explanatory view showing the plane along line III—III of FIG. 3.
Figure 3:
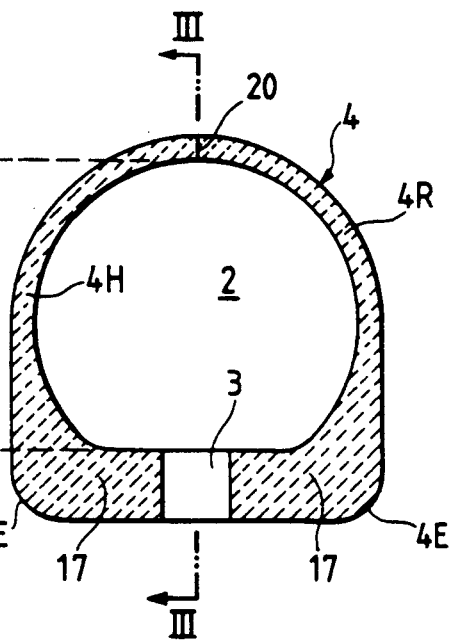
FIG. 3 is a sectional view showing another example of the swirl chamber block to be assembled in the heat-insulating structure of a swirl chamber shown in FIG. 1.
Figure 4:
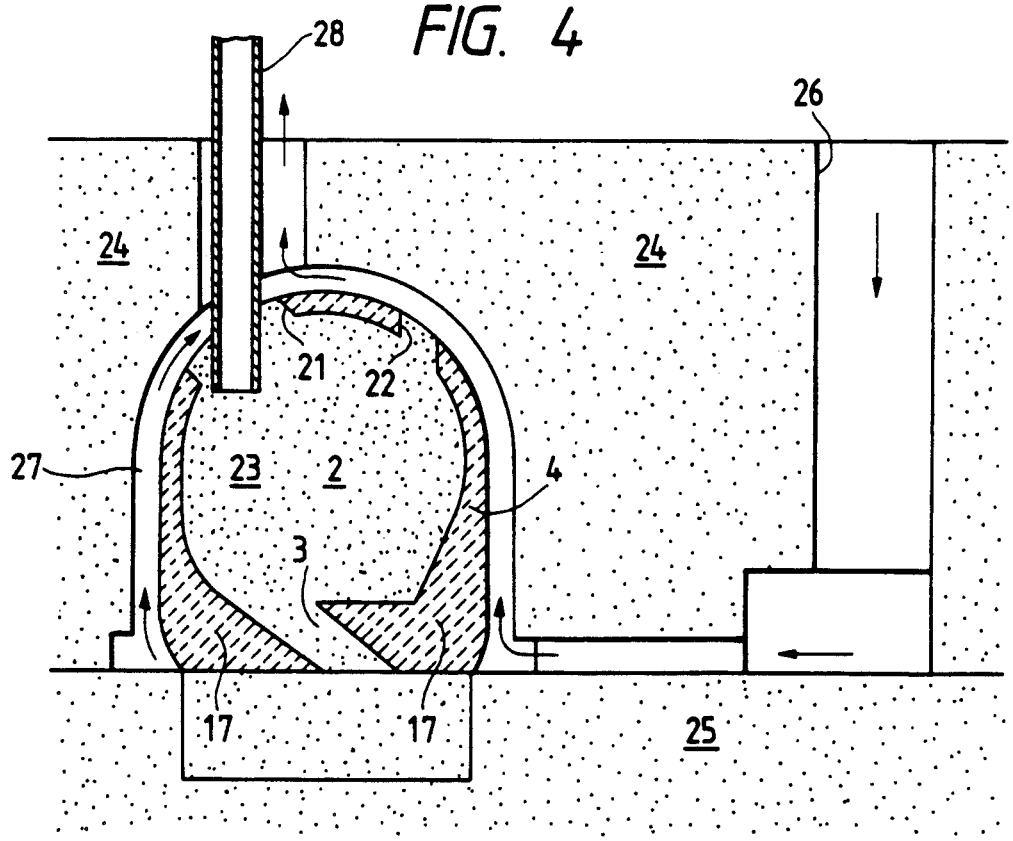
FIG. 4 is an explanatory view showing casting molds which explain a casting method of a metal material into the swirl chamber block of the heat-insulating structure of a swirl chamber shown in FIG. 1.

FIG. 3 is a sectional view showing another example of the swirl chamber block to be assembled into this heat-insulating structure of the swirl chamber, and FIG. 3(A) is an explanatory view showing the plane taken along line III—III of FIG. 3. As shown in these drawings, the swirl chamber block 4 is produced by dividing it into left and right swirl chamber blocks 4H and 4R, molding and sintering them, and bonding them together at the joint portion 20 by chemical vapor deposition, or the like. The swirl chamber block 4 can be produced in the manner described above. As to the shape of the outer peripheral surface 4E of the jet port formation portion 17 of the swirl chamber block 4, it may be formed in the straight form but more preferably, it is shaped in the tapered form with a somewhat reduced diameter as shown in the drawing. If the shape of the outer peripheral surface 4E of the jet port formation portion 17 of the swirl chamber block 4 is shaped in the tapered form, the contact area of the cast metal block 6 with the swirl chamber block 4 becomes great and the residual compressive stress generated is imparted effectively to the swirl chamber block 4.

Next, in the production method of the heat-insulating structure of the swirl chamber, machining is applied to the necessary portions of the swirl chamber block 4 produced through the steps described above and finish machining is made to the final shape of the swirl chamber block 4. Next, the outer block 6 is disposed on the outer surface 15 of the swirl chamber block 4 by casting. In this cast, casting sand 23 is packed into the portions of the swirl chamber block 4 for forming the swirl chamber 2, the jet port 3, the fitting hole 21 of the fuel injection nozzle 8 and the fitting hole 22 for the glow plug 9. The swirl chamber block 4 into which the casting sand 23 is packed is placed inside casting molds 24, 25 such as sand molds to form a cavity 27 having the shape of the outer block 6. As gas vent pipe 28 is disposed at this time in order to vent the gas generated from the casting sand 23 packed into the swirl chamber block 4 to the outside. The molten metal of Al, Fc, Niresist, or the like, is poured into the cavity 27 from a gate 26 as represented by arrow to fill the cavity 27. After the molten metal constituting the outer block 6 is cooled and solidified, the swirl chamber block 4 into which the outer block 6 is casted is withdrawn from the casting molds 24, 25 and the outer block 6 is machined to its final shape so as to complete the heat-insulating swirl chamber structure. Finally, the outer block 6 is fitted into the hole 13 formed in the cylinder head 10 and fixed to the cylinder head 10 by pushing the flange portion 5 of the outer block 6 into the inlet portion 18 of the hole 13 of the cylinder head 10.

Figure 5:
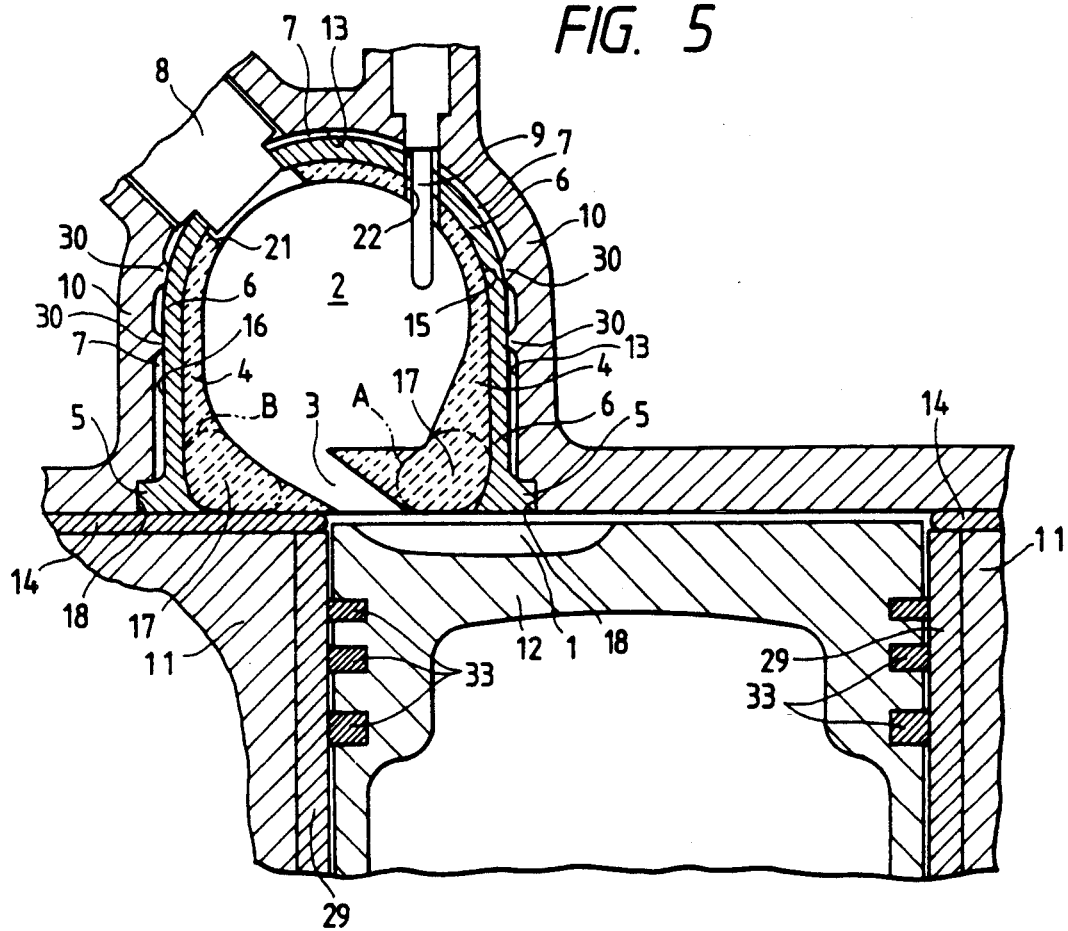
FIG. 5 is a sectional view showing the heat-insulating structure of a swirl chamber in accordance with another embodiment of the present invention.

FIG. 5 shows the heat-insulating structure of the swirl chamber in accordance with another embodiment of the present invention. This heat-insulating structure of the swirl chamber has exactly the same structure and function as those of the heat-insulating structure of the swirl chamber shown in FIG. 1 except that the fitting structure between the outer block and the cylinder head and its function are different. Accordingly, the same component is represented by the same reference numeral and repetition of explanation will be omitted.

Projections 30 coming into contact with the outer surface of the outer block 6 are formed in the hole portion 13 of the cylinder head 10. These projections 30 may be formed either on the side of the cylinder 10 or on the side of the outer block 6. Since the outer block 6 and the cylinder head 10 come into mutual contact through the projections 30, the flow of heat that flows from the outer block 6 to the cylinder head 10 can be controlled. Moreover, since the contact area and contact portions between the outer block 6 and the cylinder head 10 are controlled by the positions of dispositions of the projections 30, their size, number and contact areas, the heat energy radiated from the outer block 6 to the cylinder head 10 can be controlled to the optimum state by the selecting conditions of these projections 30.

The heat-insulating structure of the swirl chamber in accordance with the present invention is constituted in the manner described above and has the following functions.

The ceramic material constituting the swirl chamber block 4 such as silicon nitride ($Si_3N_4$), silicon carbide (SiC), aluminum titanate, etc., has high heat resistance but is weak to the tensile force. Generally, the ceramic material has the compressive strength which is by about 10 times higher than the tensile strength and has extremely high durability against the compressive strength. Furthermore, the coefficient of thermal expansion of the ceramic material is smaller than that of metal materials.

Therefore, when the ceramic material is casted to the metal, the degree of shrinkage of the metal due to cooling of the molten metal is greater than that of the ceramic material and the compressive force is in advance imported to the swirl chamber block 4 made of the ceramic material by utilizing the dimensional change resulting from shrinkage of the metal so as to secure the strength of the swirl chamber block 4. The coefficient of thermal expansion is $3.2 \times 10^{-6}$ for silicon nitride ($Si_3N_4$) as one of the ceramic materials and is about $1 \times 10^{-6}$ for aluminum titanate, for example. In contrast, it is $11 \times 10^{-6}$ for cast iron as one of the metal materials and is $22 \times 10^{-6}$ for aluminum. Accordingly, when the metal material such as Al, Fc, or the like, is solidified from the molten state and reaches the normal temperature, the difference of thermal shrinkage of about 1/10 occurs between it and the ceramic material. The compressive force corresponding to this difference of thermal shrinkage occurs in the metal material and the residual compressive stress is imparted by this metal material to the ceramic material. In other words, when the molten metal constituting the outer block 6 of the metal material is casted to the swirl chamber block 4 of the ceramic material, the compressive force occurs in the outer block due to the difference of the degree of shrinkage when the molten metal is cooled because the degree of shrinkage of the metal material is greater than that of the ceramic material, and the residual compressive stress is imparted to the swirl chamber block 4. The compressive force at the portion A of the jet port formation portion 17 of the swirl chamber block 4 can be made greater than at other portions by selecting the thickness of the outer block 6 to be casted to the optimum thickness, and the strength of the swirl chamber block 4 can be ensured to the desired strength throughout the swirl chamber block 4 as a whole.

Figure 6A:
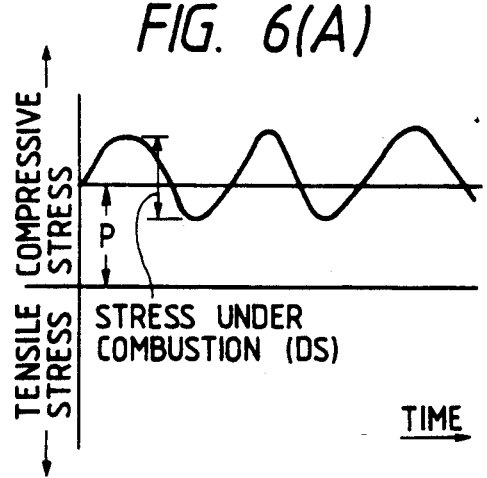
FIG. 6(A) is an explanatory view showing the acting state of the stress when the heat-insulating structure of a swirl chamber in accordance with the present invention is used.

Next, an example of the compressive force and the tensile force that act on the swirl chamber block when the heat-insulating structure of the swirl chamber is mounted to the engine and is used in practice will be explained with reference to FIGS. 6(A) and 6(B). FIG. 6(A) shows the heat-insulating structure of the swirl chamber in accordance with the present invention and FIG. (B) shows the conventional heat-insulating structure of the swirl chamber. In the drawings, the compressive force is plotted at the upper part of the ordinate and the tensile force, at the lower part. The time is plotted on the abscissa.

As is obvious from the drawings, in FIG. 6(A), if the residual compressive force P is in advance imparted to the ceramic material constituting the swirl chamber block 4, even when various stresses, that is, the working stress DS of the compressive force and the tensile force, act on the swirl chamber block 4 constituting the swirl chamber 2, the swirl chamber block 4 itself is under the state where it receives the compressive force even when the tensile force becomes excessive due to the residual compressive stress imparted in advance, so that damage due to the tensile force such as cracks, breakage, etc., does not occur in the swirl chamber block 4.

Figure 6B:
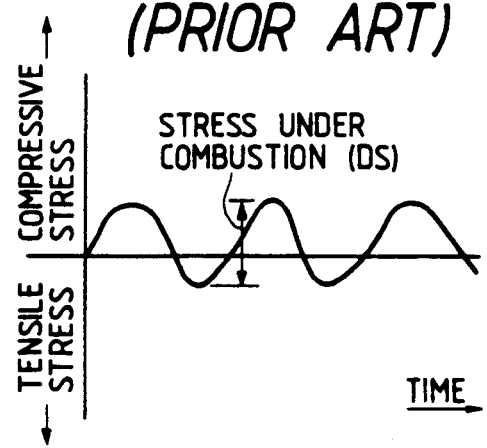
FIG. 6(B) is an explanatory view showing the acting state of the stress when the heat-insulating structure of a swirl chamber in accordance with the prior art is used.

On the contrary, the swirl chamber block of the conventional heat-insulating structure of the swirl chamber is not equipped with the outer block and the residual compressive stress is not imparted in advance, as shown in FIG. 6(B). Therefore, various stresses, that is, the working stress DS of the compressive force and the tensile force, act directly on the swirl chamber block and particularly, the swirl chamber block receives the tensile force directly, resulting in damage to the swirl chamber block such as cracks, breakage, and so forth.

The temperature difference occurs between the swirl chamber block 4 made of the ceramic material and the cast metal block 6 but if this temperature difference is small and the temperature rises in the heat-insulating structure as a whole, the residual compressive stress sometimes drops due to the difference of the coefficients of thermal expansion described above. In this case, the function of the present invention can be made effective by use of the metal having low coefficient of thermal expansion such as Niresist as the cast metal material. These materials can be selected freely in accordance with the temperature distribution of the ceramic material and casting metal.

Furthermore, the residual compressive stress imparted to the swirl chamber block 4 of the ceramic material differs depending on the thickness of the cast metal block 6. For example, when the thickness of the cast metal block 6 is increased, a large residual compressive stress is imparted to the swirl chamber block 4. If the excessive residual compressive stress is imparted to the ceramic material, on the contrary, cracks, breakage, and the like, occur in the swirl chamber block 4. Therefore, the thickness of the casting metal is preferably selected to the optimum condition in accordance with the shapes of the swirl chamber block 4 and the cast metal block 6, the compressive force, the material strength, and the like.

As described above, the heat-insulating structure of the swirl chamber in accordance with the present invention is not produced by directly casting the metal to the cylinder head 10. Accordingly, the residual compressive stress to be imparted to the swirl chamber block 4 can be controlled to a desired value. Even when the cylinder head 10 is made of either aluminum (Al) or cast iron (Fc), the casting metal to be casted into the swirl chamber 2 can be selected freely irrespective of the material of the cylinder heat 10.

What is claimed is:

1. In an internal combustion engine including a cylinder block having formed therein cylinder, a cylinder head fixed to said cylinder block and equipped with hole portions formed in such a manner as to correspond to said cylinders for forming swirl chamber, and main combustion chambers formed inside said cylinders of said cylinder block, a heat-insulating structure of a swirl chamber comprising:

swirl chamber blocks having formed therein swirl chambers and made of a ceramic material;

jet ports for establishing communication between said swirl chambers and said main combustion chambers, formed in said swirl chamber blocks in such a manner that the thickness of the formation portions of said jet ports in said swirl chamber blocks is greater than that at other portions;

metallic outer blocks formed by casting a metallic material around the outer surfaces of said swirl chamber blocks so as to apply a compressive force in advance to said swirl chamber blocks;

outwardly projecting flange portions provided on the portions of said outer blocks which corresponds to said jet ports constituting high-temperature portions of said swirl chamber blocks;

inlet portions of said hole portions, which are formed in said cylinder head, in which said flange portions of said outer blocks are fitted firmly so that said flange portions are in contact with the inner surfaces of said inlet portions, for the purpose of letting a part of the heat of said high-temperature portions in which said jet ports are formed escape therefrom to said cylinder head through said flange portions; and air layers formed between the outer surfaces of said outer blocks and the inner surfaces of said hole portions formed in said cylinder head, for the purpose of preventing heat from flowing from said outer blocks to said cylinder head.

2. A heat-insulating structure of a swirl chamber according to claim 1, wherein fitting and fixing of said outer block into said hole portion formed in said cylinder head is accomplished by pushing the flange portion disposed on said outer block into the inlet portion of said hole portion.

3. A heat-insulating structure of a swirl chamber according to claim 1, wherein the contact area and contact position between the outer surface of said outer block and the inner surface of said hole portion formed in said cylinder head are set so that the temperature distribution of said swirl chamber block becomes uniform.

4. A heat-insulating structure of a swirl chamber according to claim 1, wherein said ceramic material for forming said swirl chamber block is silicon nitride.

5. A heat-insulating structure of a swirl chamber according to claim 1, wherein said ceramic material for forming said swirl chamber block is silicon carbide.

6. A heat-insulating structure of a swirl chamber according to claim 1, wherein said metal material constituting said outer block is a member selected from the group consisting of aluminum, cast iron and Niresist.

* * * * *